United States Patent

Ha et al.

[11] Patent Number: 6,100,938
[45] Date of Patent: Aug. 8, 2000

[54] GAMMA CORRECTION CIRCUIT FOR TELEVISION RECEIVER

[75] Inventors: Yeong-Ho Ha, Daeku; Tae-Shik Kim, Kyungsangbuk-Do, both of Rep. of Korea

[73] Assignee: LG Electronics Inc., Seoul, Rep. of Korea

[21] Appl. No.: 08/893,236

[22] Filed: Jul. 15, 1997

[30] Foreign Application Priority Data

Jul. 16, 1996 [KR] Rep. of Korea ........................ 96-28704

[51] Int. Cl.[7] .......................... H04N 5/202; H04N 9/708; H04N 9/64; H04N 9/68
[52] U.S. Cl. .......................... 348/674; 348/674; 348/234; 348/666; 348/708; 358/32
[58] Field of Search .................................. 348/234, 254, 348/255, 256, 674, 675, 663, 712, 713, 666, 708, 631, 664, 665; 358/32; H04N 9/69

[56] References Cited

U.S. PATENT DOCUMENTS

| | | | |
|---|---|---|---|
| 4,223,342 | 9/1980 | Tsuchiya et al. | 348/628 |
| 5,089,890 | 2/1992 | Takayama | 348/674 |
| 5,175,621 | 12/1992 | Maesato | 348/674 |
| 5,345,265 | 9/1994 | Kim | 348/254 |
| 5,534,948 | 7/1996 | Baldwin | 348/254 |
| 5,548,330 | 8/1996 | Hieda et al. | 348/234 |
| 5,671,023 | 9/1997 | Nishiwaki et al. | 348/254 |
| 5,786,871 | 7/1998 | Penney | 348/645 |

*Primary Examiner*—John K. Peng
*Assistant Examiner*—Paulos Natnael

[57] ABSTRACT

A gamma correction circuit for a television receiver includes a low pass filter for filtering a luminance signal gamma-corrected in a transmitter side and outputting a low frequency zone component luminance signal, a luminance signal corrector for compensating for a high frequency zone component with regard to a color signal transmitted from the transmitter side and the low frequency zone component luminance signal outputted from the low pass filter, an operator for applying a subtraction and a division with regard to the low frequency zone component luminance signal outputted from the low pass filter and the corrected luminance signal, and a color signal restoration unit for restoring a original color signal using the color signal corrected in the corrector and the luminance signal outputted from operator, for thereby being provided to a CPT (color picture tube). The circuit decreases a picture quality degradation and a detail aggravation in accordance with a gamma correction and a zone confinement of a color signal in the transmitter side.

6 Claims, 4 Drawing Sheets

GAMMA CORRECTION CIRCUIT FOR TELEVISION RECEIVER

BACKGROUND OF THE INVENTION

1. Field of the Invention

The present invention relates to an apparatus for enhancing a picture quality for a television receiver, and more particularly to an improved gamma correction circuit for a television receiver which makes it possible to compensate for a picture quality degradation and a detail aggravation of a reproduced on-screen image that occur in accordance with a transmitter's gamma correction.

2. Description of the Prior Art

Recently, as a television receiver tends to be bigger, more deluxe and multi-functional, diversified studies are being made to accomplish objectives concerned, such as high luminance, high definition, noise elimination, and high clearness.

However, despite such efforts, there still remains much room for more improvement with regard to fundamental factors that may cause picture quality degradation. Further, there is required a study as to a method of color reproduction using a quantitative analysis.

In a presently adopted NTSC (national television system committee) method, a picture obtained from an RGB (red-green-blue) coordinate system is converted to a YIQ coordinate system, for thereby being transmitted as a color difference signal, and a television receiver converts the transmitted color difference signal to an RGB signal so as to reproduce a color picture.

When a color reproduction is achieved in an NTSC color television system, there occur a variety of color reproduction errors depending upon characteristics of a receive/transmit circuit for sending an original picture, a modulation/demodulation circuit, and a television receiver.

As shown in FIG. 1, a CPT (color picture tube) adopted in the NTSC color television system is provided with a gamma characteristic in which a luminance signal y serving as a light-emission output value of the television receiver is non-linearly proportional to a y square of a video signal x, for thereby obtaining an equation $y=kx^\gamma$ in a light-emitting zone. The CPT is also provided with a non-linear characteristic in which a light-emission does not occur with regard to a negative input signal.

So, in order to compensate for such a non-linear characteristic of a television receiver under a current NTSC television system, there is carried out a γ correction in which the non-linear characteristic of the RGB signal is compensated for in the television receiver before the RGB signal is converted to the YIQ signal.

With reference to FIG. 1, a conventional NTSC TV system is provided with: a camera 10 for linearly obtaining a brightness data of an object material and outputting an original color RGB signal; a gamma correction unit 11 for applying a gamma correction to the original RGB signal outputted from the camera 10; a matrix 12 for converting the original RGB signal outputted from the gamma correction unit 11 to a color difference YIQ signal; a zone confinement unit 13 for confining a frequency zone of the color difference YIQ signal outputted from the matrix 12; an adder 14 for adding the output value of the zone confinement unit 13 to an distortion value d of a transmission channel; an inverse matrix 15 for converting the output of the adder 14 to original color RGB signal; and a CPT 16 for displaying the original color RGB signal outputted from the inverse matrix 15.

The operation of the thusly constituted conventional NTSC TV system will now be described with reference to the accompanying drawings.

The camera 10 linearly obtains a brightness data of an object material and outputs a picture data X serving as the output value $E_R, E_G, E_B$ of the camera 10, or a transmission channel signal. The picture data X may be expressed as a vector with regard to a luminance signal and a pair of color signals as shown below:

$$X = \begin{bmatrix} X_1 \\ X_2 \\ X_3 \end{bmatrix} = \begin{bmatrix} E_R \\ E_G \\ E_B \end{bmatrix}$$

The gamma compensation unit 11 receives the picture data X and applies a gamma correction $X^\Gamma$ to the original color RGB signal so as to compensate for a non-linear characteristic of a television receiver, and the matrix related thereto is as the following:

$$X^\Gamma = \begin{bmatrix} X_1^\Gamma \\ X_2^\Gamma \\ X_3^\Gamma \end{bmatrix}$$

The matrix 12 receives the original RGB signal compensated in the gamma correction unit 11, and it is multiplied by a conversion coefficient M so as to obtain $[M*(X)^\Gamma]$, converted into a luminance signal Y and a color difference signal IQ, and transmitted through a transmission channel.

$\Psi(X) = 0.3X_1 + 0.59X_2 + 0.11X_3$ $I(X) = 0.7X_1 - 0.59X_2 + 0.11X_3$ $Q(X) = -0.3X_1 + 0.59X_2 + 0.89X_3$

At this time, the conversion coefficient M may be expressed as the following matrix:

$$M = \begin{bmatrix} 0.3 & 0.59 & 0.11 \\ 0.7 & -0.59 & 0.11 \\ -0.3 & 0.59 & 0.89 \end{bmatrix}$$

The zone confinement unit 13 serving as a transmission channel confines the respective zones of the luminance signal Ψ and color difference signals I, Q to 0.5 Mhz or 1.5 Mhz, and the channel frequency characteristic F in the zone confinement unit 13 is expressed as below:

$$F = \begin{bmatrix} E & : f < f_c \\ \begin{bmatrix} 1 & 0 & 0 \\ 0 & 0 & 0 \\ 0 & 0 & 0 \end{bmatrix} & : f > f_c \end{bmatrix}$$

Here, E denotes a unit matrix, and $f_c$ denotes a color signal breaking frequency.

Also, the adder 14 adds a distortion value d of the transmission channel to the output of the zone confinement unit 13, and the resultant value is outputted through the channel.

The receiver side matrix 15 converts to the original color RGB signal the luminance signal Y and the color difference signals I, Q which are transmitted through the transmission channel so as to be outputted to the CPT, wherein the process is carried out by reverse-converting the conversion coefficient M of the matrix 11.

At this time, the reverse-conversion in the receiver side may be expressed as $M^{-1}=(I_{ij})$, which denotes an inverse matrix of a matrix $M=(m_{ij})$ in the transmitter side.

The CPT 16 serves to output a color signal $X_D$ and a luminance signal $Y_D$ as shown below:

$$X_D = [M_1(F^*M^*(X)^\Gamma + d)]^\gamma$$

$$Y_D = \Psi(X_D)$$

Here, d denotes a distortion value of the transmission channel, and $\gamma$ is equal to $1/\Gamma$.

The picture data X outputted from the camera 10 may be expressed as a sum obtained by adding a low frequency component $X_L$ and a high frequency component $X_H$ under a criterion of a color signal breaking frequency $f_c$ for thereby turning out an expression $X_i = X_{Li} + X_{Hi}$.

At this time, assuming that the high frequency component is less than the low frequency component, the output Xr is as shown below:

$$X_i^\Gamma = X_{Li}^\Gamma + \Gamma X_{Hi} X_{Li}^{\Gamma-1}$$

The output $X_D$ of the CPT 16 realized in the currently adopted NTSC system is as shown in an expression (1), in which the high frequency component $X_H$ which is larger than the color signal breaking frequency $f_c$ is distorted by a gamma correction in the transmitter side:

$$X_D = [X_L^\Gamma + \Gamma\Psi(X_{Hi}X_L^{\Gamma-1})]^\gamma = X_L + X_L^{1-\Gamma}\Psi(X_{Hi}X_L^{\Gamma-1}) \tag{1}$$

The luminance signal $Y_D$ outputted from the CPT 16 may be incorporated into a low frequency component $Y_L$ and a high frequency component $Y_{DH}$, wherein the luminance signal $Y_D$ may be expressed as an expression (2) and the high frequency component $Y_{DH}$ may be expressed as an expression (3):

$$Y_D = \Psi(X_D) = Y_L + Y_{DH} \tag{2}$$

$$Y_{DH} = \Sigma m_{1k} X_{Lk}^{1-\Gamma} \Sigma m_{1i} X_{Hi} X_{Li}^{\Gamma-1} \tag{3}$$

Due to the gamma correction in the transmitter side with reference to the expression (3), the low frequency component $Y_L$ of the luminance signal $Y_D$ which exists below the color signal zone becomes correctly reproduced, however, the high frequency component $Y_{DH}$ becomes distorted in accordance with a gamma correction in the transmitter side.

At this time, the proportion P in which a luminance signal is reproduced may be expressed as an expression (4):

$$P = \frac{Y_{DH}}{Y_H} = \sum m_{LK}^{1-\Gamma} \sum m_{1i} X_{Hi} X_{Li}^{\Gamma-1} / \sum m_{1i} X_{Hi} \tag{4}$$

That is, when a picture is colorless, P=1 becomes satisfied so as to represent that the luminance signal is correctly reproduced. For instance, when only a high chromatic green picture is transmitted, the proportion P of the luminance signal being reproduced becomes 20 dB as shown in an expression (5):

$$P = \frac{(m_{13}X_{L3}^{1-\Gamma})(m_{13}X_{H3}^{\Gamma-1})}{M_{13}X_{H3}}$$

$$= \frac{(0.11 B_L^{1-\Gamma})(0.11 B_H^{\Gamma-1})}{0.11 B_H}$$

$$= 0.11 = 20\, dB \tag{5}$$

FIG. 2 exhibits brightness of the high frequency component $Y_{DH}$ with regard to the luminance signal $Y_D$ reproduced in the CPT 16 when a color becomes converted to a more chromatic color picture such as red, green and blue, as shown therein, a detail degradation becomes significantly larger in a high chromatic color picture. That is, the graph in FIG. 2 denotes the high chromatic detail degradation according to the gamma correction in the transmitter side.

Meanwhile, the proportion P in which a luminance signal is reproduced is a six-variable function between $X_L$ and $X_H$, so that the proportion P does not become a value 1. When there is provided a high frequency component in the expression (5), the high frequency component of a reproduced luminance with regard to an object color may be expressed as an expression (6):

$$P = \sum m_{1s} + \sum_{i \neq s} m_{1i}\left(\frac{X_{Li}}{X_{Ls}}\right)^{1-\Gamma} \tag{6}$$

Also, when there exist high frequency components for red, green and blue ($X_{H1} \approx X_{H2} \approx X_{H3}$), the high frequency components of the reproduced luminance with regard to the luminance component of the object color may be expressed as an expression (7), wherein the reproduced brightness with regard to the high frequency components is larger that of the camera 10 output.

$$P = \sum (m_{1s})^2 + \sum_{i \neq j} m_{1i} m_{1i}\left[\left(\frac{X_{Li}}{X_{Ls}}\right)^{1-\Gamma} + \left(\frac{X_{Li}}{X_{Ls}}\right)^{1-\Gamma}\right] \geq 1 \tag{7}$$

As described above, in the case in which a picture that is to be reproduced is of a high luminance picture, the brightness data being transmitted in accordance with the color difference signals I, Q is larger than the brightness of the luminance signal, and the zone for color signals confined to 0.5 Mhz or 1.5 Mhz, so that a brightness data higher than that of the breaking frequency becomes lost, whereby there occurs a significant picture quality degradation in the picture reproduction.

In order to improve such picture degradation, an EDTV in Japan employs a gamma correction circuit 20 in a transmitter side as shown in FIG. 3.

At this time, the gamma correction circuit 20 is focused on what extent of a high frequency luminance signal should be sent to the transmitter side so as to correctly reproduce a high frequency signal in the receiver side.

That is, the matrix 20-1 of the gamma correction circuit 20 receives color signals R, G, B from the camera 10, and it is multiplied by a conversion coefficient M of the transmitter side and converted into a luminance component Y. The converted luminance component Y serving as a low zone component is eliminated from a high pass filter 20-2, whereby only a luminance signal $Y_B$ serving as a high zone component is provided to a divider 20-4.

The divider 20-4 receives a color signal $X_r$ through a zone confinement unit 13 and an amplifier 20-3, and the high zone component luminance signal $Y_H$ is divided by the received color signal $X_r$, for thereby obtaining a compensated luminance signal h.

That is, the signal $X_R$ modulated in the transmitter side may be expressed as an expression (8) in the receiver side:

$$X_R = M^1 \begin{bmatrix} Y \\ I \\ Q \end{bmatrix} = \begin{bmatrix} M^1 M(X_L)^\Gamma + \begin{bmatrix} h \\ h \\ h \end{bmatrix} \end{bmatrix} = X_L^\Gamma + \begin{bmatrix} h \\ h \\ h \end{bmatrix} \quad (8)$$

Here, if $h \ll X_L$ is satisfied, the luminance signal $Y_D$ outputted from the CPT 16 may be expressed as an expression (9):

$$Y_D = \Psi(X_L) + \gamma h \Psi(X_L^{1-\Gamma}) \quad (9)$$

In order for the luminance signal $Y_D$ in the expression (9) to be proportional to a brightness signal of an object, the value h should satisfy an expression (10):

$$h = Y_H / \gamma \Psi(X_L^{1-\Gamma}) \quad (10)$$

Here, assuming that the gamma value in the CPT 16 is "2", h serving as an output value of the gamma correction circuit 20 may be expressed as an expression (11):

$$h = Y_H / 2Y_L \quad (11)$$

As a result, the gamma correction circuit 20 is focused on what extent of the luminance signal of the high frequency zone in the transmitter side should be transmitted in order to correctly reproduce the high frequency signal, for thereby correcting the high frequency zone of the luminance signal.

However, the conventional gamma correction has a disadvantage in that, an additional correction circuit should be realized in the transmission system side which serves to transmit a TV signal, and further a standard for the currently employed NTSC system should be transformed.

SUMMARY OF THE INVENTION

Accordingly, it is an object of the present invention to provide a gamma correction circuit for a television receiver capable of decreasing a picture quality degradation and a detail aggravation by realizing the gamma correction circuit in a receiver side so as to satisfy a TV criterion according to the current NTSC system.

To achieve the above-described object, there is provided a gamma correction circuit for a television receiver according to the present invention which includes a low pass filter for filtering a luminance signal gamma-corrected in a transmitter side and outputting a low frequency zone component luminance signal, a luminance signal corrector for compensating for a high frequency zone component with regard to a color signal transmitted from the transmitter side and the low frequency zone component luminance signal outputted from the low pass filter, an operator for applying a subtraction and a division with regard to the low frequency zone component luminance signal outputted from the low pass filter and the corrected luminance signal, and a color signal restoration unit for restoring a original color signal using the color signal corrected in the corrector and the luminance signal outputted from operator, for thereby being provided to a CPT (color picture tube).

DETAILED DESCRIPTION OF THE PRESENT INVENTION

Figure 1:
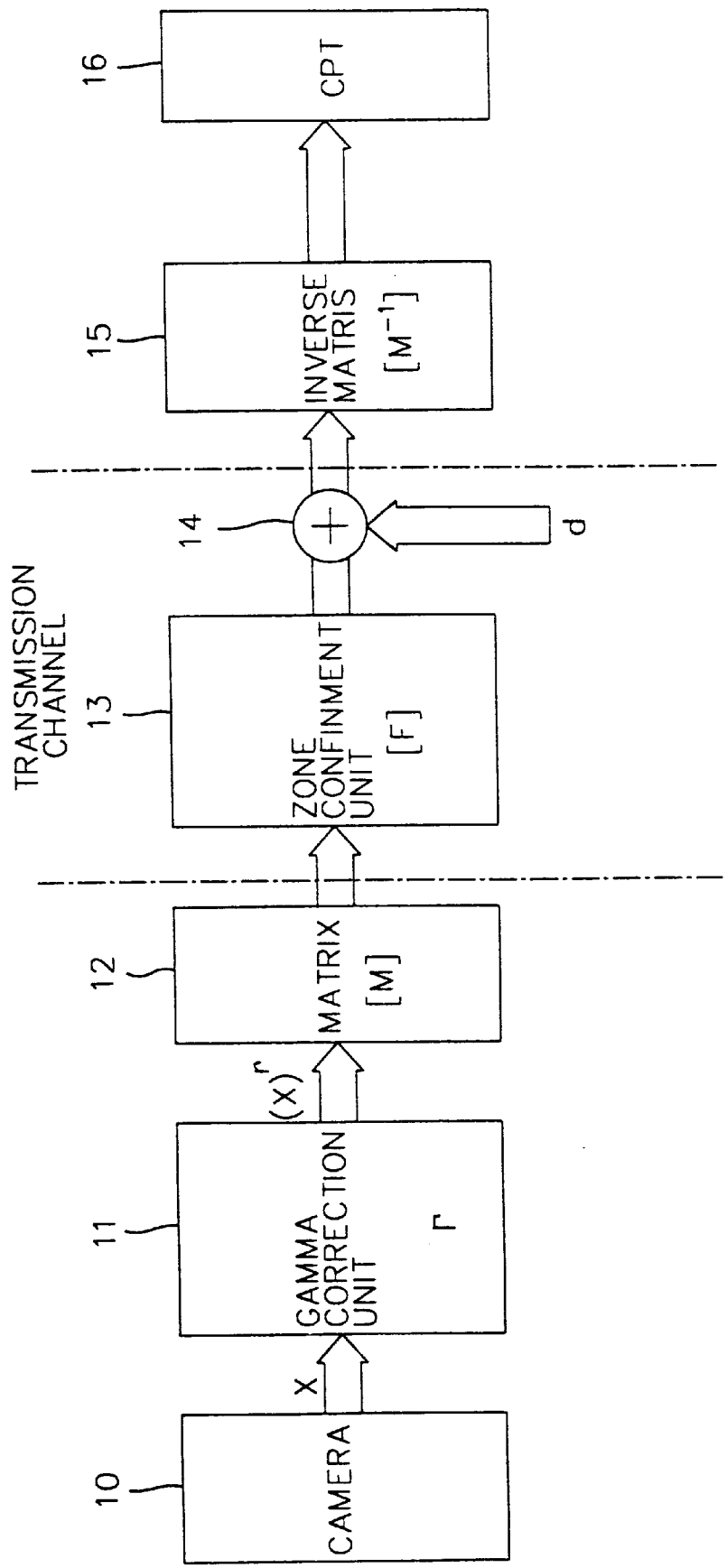
FIG. 1 is a block diagram of a conventional NTSC TV system.
Figure 2:
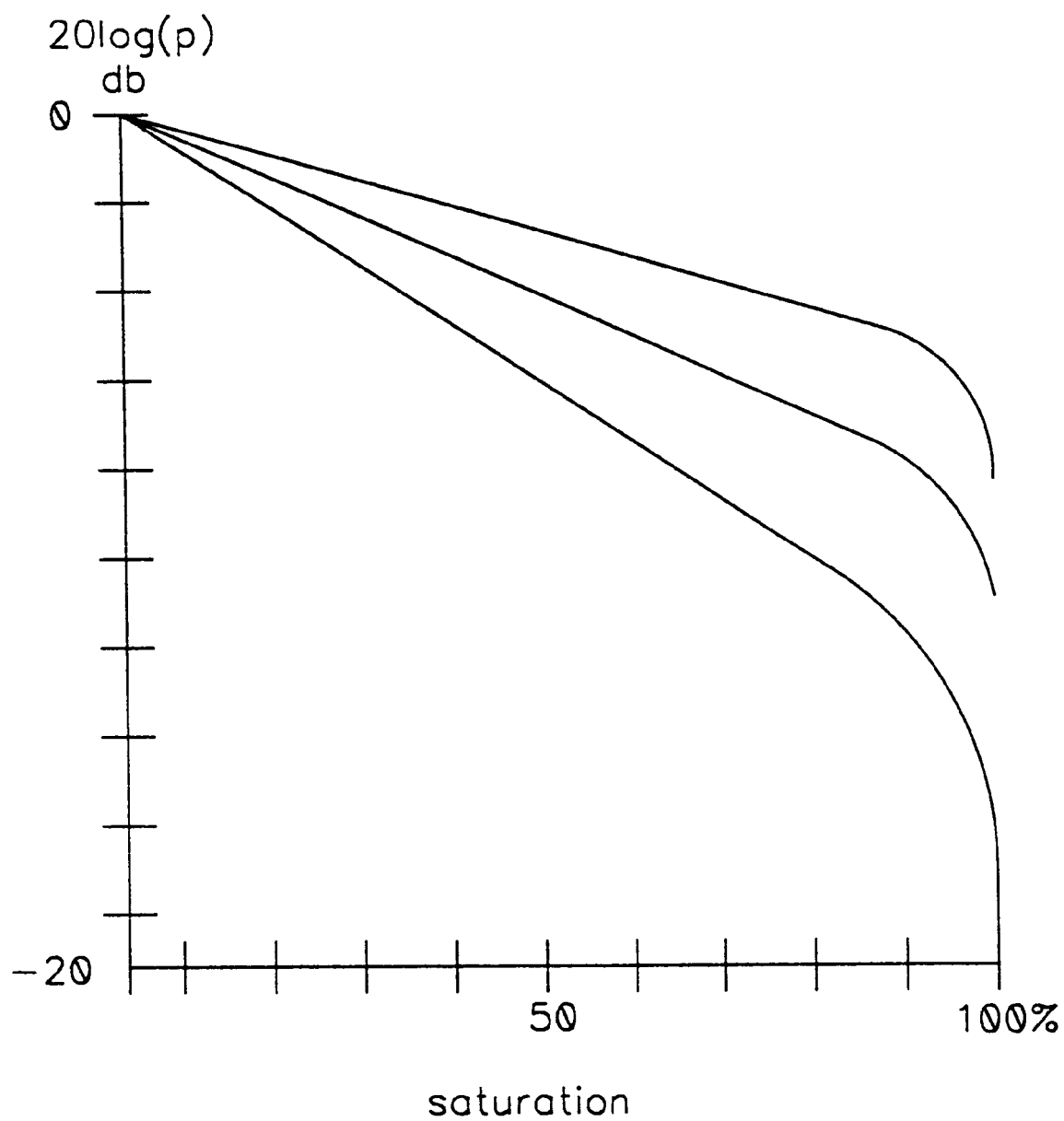
FIG. 2 is a graph illustrating a relation of a high chromatic picture versus a degradation of a luminance signal.
Figure 3:
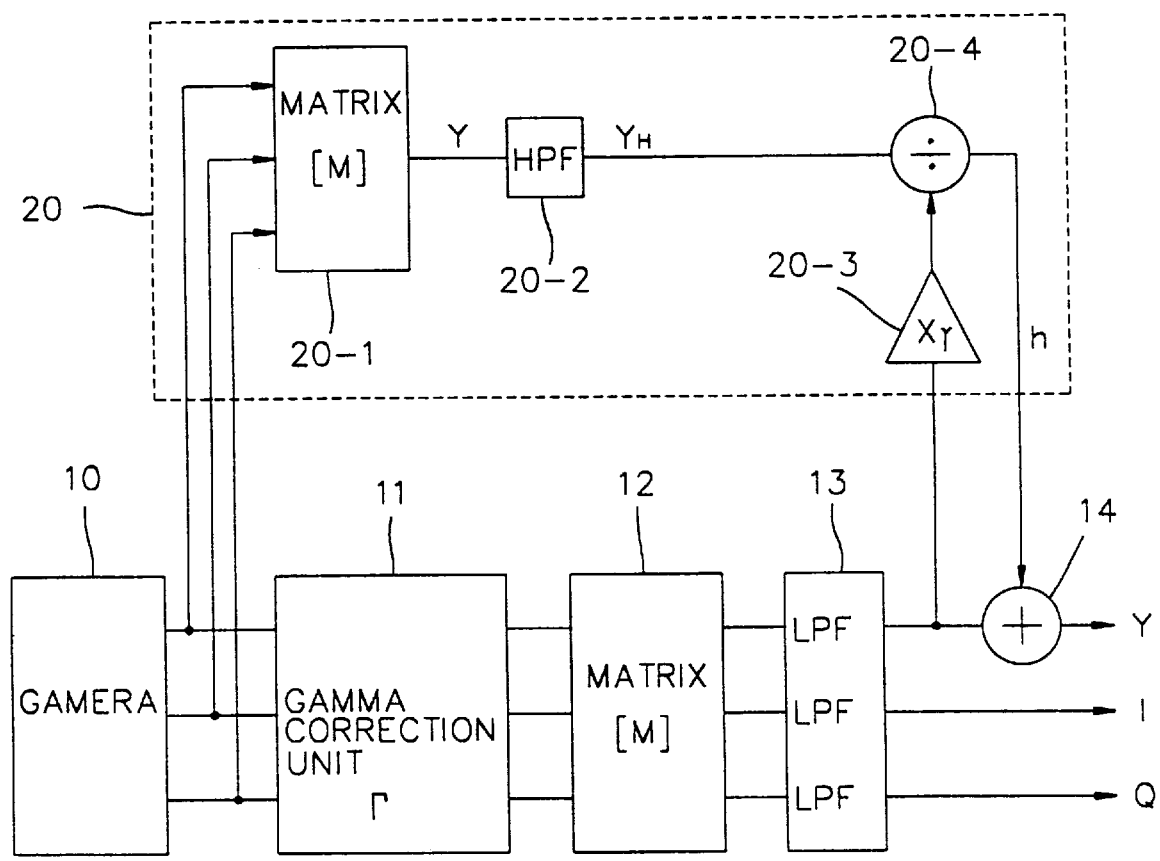
FIG. 3 is a block diagram of an EDTV provided with a conventional gamma correction circuit.
Figure 4:
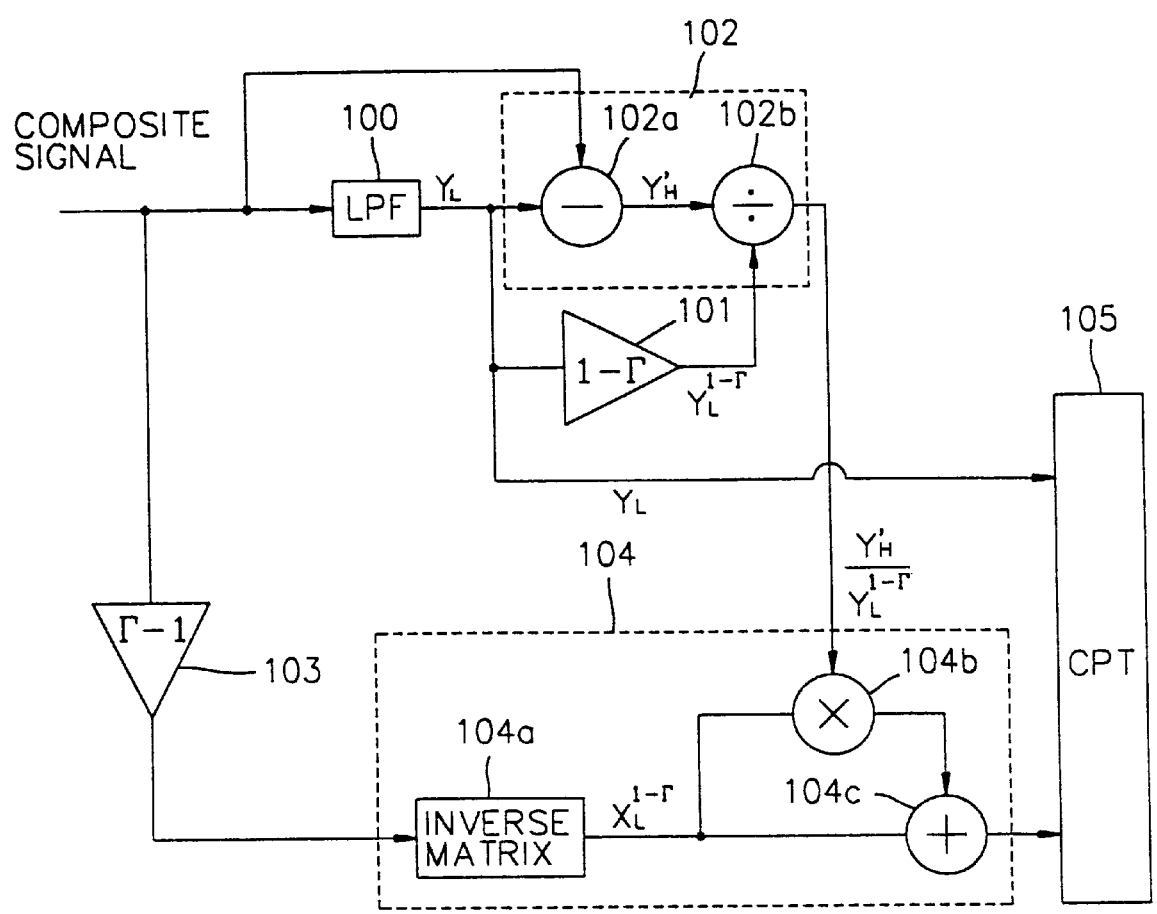
FIG. 4 is a block diagram of a gamma correction circuit for a television receiver according to the present invention.

With reference to FIG. 4, the gamma correction circuit for a television receiver according to the present invention is provided with: a low pass filter 100 for filtering a luminance signal which is gamma-corrected in a transmitter side; a luminance signal corrector 101 for compensating a high frequency zone component with regard to a low frequency zone component luminance signal $Y_L$ outputted from the low pass filter 100; an operator 102 for subtracting the low frequency zone component luminance signal $Y_L$ outputted from the low pass filter 100 and the luminance signal which is gamma-corrected in the transmitter side, and dividing the subtracted luminance signal $Y_H'$ by the luminance signal $Y_L^{1-\Gamma}$ outputted from the luminance corrector 101; a color signal corrector 103 for correcting a high frequency zone component with regard to the color signal $X_L$ transmitted from the transmitter side; and a color signal restoration unit 104 for multiplying and adding the output of the operator 102 after inverse-converting the color signal $X_L^{\Gamma-1}$ outputted from the color signal corrector 103, and for thereby restoring the original color signal.

The operator 102 is composed of an adder 102a and a divider 102b. The color signal restoration unit 104 includes: an inverse matrix for inverse-converting the color signal $X_L^{\Gamma-1}$ outputted from the color signal corrector 103; a multiplier 104b for multiplying the color signal $X_L^{1-\Gamma}$ outputted from the inverse matrix 104a and the output of the divider 102b; and the adder 104c for adding the output of the multiplier 104b and the color signal $X_L^{1-\Gamma}$ outputted from the inverse matrix 104a, for thereby outputting the resultant value to the CPT 105.

The operation of the thusly constituted gamma correction circuit for a television receiver according to the present invention will now be described with reference to the accompanying drawings.

First, when the complex picture signal transmitted through the transmission channel and gamma-corrected in the transmitter side is applied to the receiver, the low pass filter 100 receives a luminance signal among the complex picture signals, and filters a low frequency zone component. The luminance signal corrector 101 compensates for a high frequency zone component with regard to the low frequency component luminance signal $Y_L$ outputted from the low pass filter 100.

The subtractor 102a of the operator 102 subtracts a low frequency zone component luminance signal $Y_L$ outputted from the low pass filter 100 and the luminance signal gamma-corrected in the transmitter side. The divider 102b divides the luminance signal $Y_H'$ outputted from the subtractor 102a by the luminance signal $X_L^{1-\Gamma}$ outputted from the luminance signal corrector 101.

In the meantime, the color signal corrector 103 receives the color signal $X_L$ among the complex picture signals, compensates a high frequency zone component. The inverse matrix 104a of the color signal restoration unit 104 inverse-converts the color signal $X_L^{\Gamma-1}$ outputted from the color signal corrector 103. The multiplier 104b multiplies the color signal $X_L^{1-\Gamma}$ outputted from the inverse matrix 104a, and the output of the divider 102b.

The adder 104c adds the output of the multiplier 104b and the color signal $X_L^{1-\Gamma}$ outputted from the inverse matrix 104a, for thereby outputting the low frequency component color signal $X_L$ to the CPT 105.

That is, in order to compensate for a distortion with regard to a signal having more than a breaking frequency in the conventional NTSC system, when the expression (1) is applied to Schwarz inequality, there is obtained an expression (12):

$$X_D = X_L + X_L^{1-\Gamma}\Psi(X_{Hi}X_L^{\Gamma-1}) \leq x_i + X_L^{1-\Gamma}\Psi(X_H) * \Psi(X_L^{\Gamma-1}) \quad (12)$$

Here, when a high frequency zone correction is applied to the expression (12) in an amount of $$\frac{1}{Y_L^{1-\Gamma} X_L^{\Gamma-1}},$$

the color signal $X_D$ realized in the CPT 105 may be expressed as an expression (13):

$$X_D \doteq X_L + X_L^{1-\Gamma}\Psi(X_H) * \Psi(X_L^{1-\Gamma})\frac{1}{Y_L^{1-\Gamma} X_L^{\Gamma-1}} \quad (13)$$

Also, the luminance signal $Y_D$ reproduced in the CPT 105 may be expressed as an expression (14):

$$Y_D \doteq \Psi(X_L) + \Psi(X_H)\frac{\Psi(X_L^{1-\Gamma})}{Y_L^{1-\Gamma}} \quad (14)$$

$$\doteq \Psi(X_L) + \Psi(X_H)\frac{Y_L'}{Y_L}$$

$$\doteq Y_L + Y_H$$

At this time, the realized luminance signal $Y_D$ is correctly reproduced without distortion.

As described above, the gamma correction circuit for a television receiver according to the present invention realizes the gamma correction circuit in the receiver side for becoming compatible to a current NTSC TV criterion, so as to compensate for a picture quality degradation and a detail aggravation in accordance with a picture reproduced by a transmitter side gamma correction, thereby decreasing a picture quality degradation and a detail aggravation in accordance with a gamma correction and a zone confinement of a color signal in the transmitter side.

What is claimed is:

1. A gamma correction circuit for a television receiver, comprising:
   a low pass filter for filtering a gamma-corrected luminance signal, gamma-corrected at a transmitter side;
   a luminance signal corrector for generating a first correction value to correct a high frequency component of the filtered luminance signal, the high frequency component being distorted due to the gamma correction at the transmitter side;
   an operator for extracting the high frequency component from the gamma-corrected luminance signal and the filtered luminance signal, and for dividing the extracted high frequency component by the first correction value;
   a color signal corrector for generating a second correction value to correct a high frequency component of a color signal transmitted from the transmitter side; and
   a color signal restoration unit for inverse-converting the second correction value, multiplying the inverse-converted second value and an output of the operator, and outputting the multiplied value.

2. The circuit of claim 1, wherein the operator comprises:
   a subtractor for subtracting the filtered luminance signal from the gamma-corrected luminance signal; and
   a divider for dividing the extracted high frequency component by the first correction value.

3. A gamma correction circuit for a television receiver, comprising:
   a low pass filter for filtering a luminance signal gamma-corrected at a transmitter side and outputting a low frequency zone component luminance signal;
   a luminance signal corrector for compensating for the low frequency zone component luminance signal output from the low pass filter and for outputting a corrected luminance signal;
   an operator for applying a subtraction and a division with regard to the low frequency zone component luminance signal and the corrected luminance signal;
   a color signal corrector for correcting a color signal transmitted from the transmitter side; and
   a color signal restoration unit for restoring an original color signal using the corrected color signal and an output of the operator, the original color signal being provided to a display,
   wherein the luminance signal corrector corrects the low frequency component luminance signal outputted from the low pass filter by an amount $1-\Gamma$, and the color signal corrector corrects the color signal transmitted from the transmitter side by an amount $\Gamma-1$, where $\Gamma$ is a degree of gamma compensation.

4. A gamma correction circuit for a television receiver, comprising:
   a low pass filter for filtering a luminance signal gamma-corrected at a transmitter side and outputting a low frequency zone component luminance signal;
   a luminance signal corrector for compensating for the low frequency zone component luminance signal output from the low pass filter and for outputting a corrected luminance signal;
   an operator for applying a subtraction and a division with regard to the low frequency zone component luminance signal and the corrected luminance signal;
   a color signal corrector for correcting a color signal transmitted from the transmitter side, and for outputting a corrected color signal; and
   a color signal restoration unit for restoring an original color signal using the corrected color signal and an output of the operator, the original color signal being provided to a display,
   wherein the color signal restoration unit comprises:
      an inverse matrix unit for inverse-converting the corrected color signal;
      a multiplier for multiplying an output of the inverse matrix unit and an output of the operator; and
      an adder for adding an output of the multiplier and the corrected color signal, for thereby outputting the resultant value to the CPT.

5. A gamma correction circuit for a television receiver, comprising:
   a low pass filter for filtering an input luminance signal and for generating a low frequency luminance signal;
   a luminance signal corrector for generating a first correction signal from the low frequency luminance signal;

an operator for generating a high frequency luminance signal from the low frequency luminance signal and the input luminance signal, and for generating a ratio of the high frequency luminance signal to the first correction signal;

a color signal corrector for generating a second correction signal from an input color signal; and a color signal restoration unit for inverse-converting the second correction signal, and for multiplying the inverse-converted second correction signal by the ratio.

6. A method of performing gamma correction in a television receiver, comprising:

filtering an input luminance signal to produce a low frequency luminance signal;

correcting the low frequency luminance signal to produce a first correction signal;

generating a high frequency luminance signal from the input luminance signal and the low frequency luminance signal;

dividing the high frequency luminance signal by the first correction signal to output a ratio;

correcting an input color signal to produce a second correction signal;

inverse-converting the second correction signal; and multiplying the inverse-converted second correction signal by the ratio.

* * * * *